(12) United States Patent
Rosenfellner

(10) Patent No.: US 10,947,050 B2
(45) Date of Patent: Mar. 16, 2021

(54) CONVEYING A MATERIAL TO BE CONVEYED

(71) Applicant: Primetals Technologies Austria GmbH, Linz (AT)

(72) Inventor: Gerald Rosenfellner, Ertl (AT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 0 days.

(21) Appl. No.: 16/612,912

(22) PCT Filed: May 3, 2018

(86) PCT No.: PCT/EP2018/061309
§ 371 (c)(1),
(2) Date: Nov. 12, 2019

(87) PCT Pub. No.: WO2018/206384
PCT Pub. Date: Nov. 15, 2018

(65) Prior Publication Data
US 2020/0165068 A1    May 28, 2020

(30) Foreign Application Priority Data
May 12, 2017   (EP) ..................... 17170817

(51) Int. Cl.
*B65G 21/08*   (2006.01)
*B65G 69/18*   (2006.01)
(Continued)

(52) U.S. Cl.
CPC .......... *B65G 21/08* (2013.01); *B65G 69/182* (2013.01); *B65G 69/20* (2013.01);
(Continued)

(58) Field of Classification Search
CPC ...... B65G 21/08; B65G 69/182; B65G 69/20; B65G 2207/40; B65G 69/18;
(Continued)

(56) References Cited

U.S. PATENT DOCUMENTS

| 3,036,440 A | 5/1962 | Feinman |
| 3,096,627 A | 7/1963 | Morrison |

(Continued)

FOREIGN PATENT DOCUMENTS

| CN | 201020550715 | * | 9/2010 | ............ B65G 21/08 |
| CN | 201842461 U | * | 5/2011 | |

(Continued)

OTHER PUBLICATIONS

International Search Report dated Jun. 13, 2018 in corresponding PCT International Application No. PCT/EP2018/061309.

(Continued)

*Primary Examiner* — Gene O Crawford
*Assistant Examiner* — Lester Rushin, III
(74) *Attorney, Agent, or Firm* — Ostrolenk Faber LLP

(57) ABSTRACT

A conveyor system (1) for the continuous or discontinuous conveyance of a reactive and/or hot and/or abrasive material to be conveyed along a conveyor path includes a system housing (3) enclosing the conveyor path, which has at least one fluid inlet (5) for the introduction of fluid into the system housing (3), at least one fluid outlet (7, 9) for the discharge of fluid out of the system housing (3), a charging inlet (4) for introducing material to be conveyed into the system housing (3), and, apart from the at least one fluid inlet (5), the at least one fluid outlet (7, 9) and the charging inlet (4), are implemented in a technically fluid-tight manner.

19 Claims, 5 Drawing Sheets

(51) Int. Cl.
*B65G 69/20* (2006.01)
*C21C 5/52* (2006.01)
*F27B 3/18* (2006.01)

(52) U.S. Cl.
CPC .......... *B65G 2207/40* (2013.01); *C21C 5/527* (2013.01); *F27B 3/18* (2013.01)

(58) Field of Classification Search
CPC ............... B65G 69/183; C21C 5/527; C21C 2005/5276; F27B 3/18
USPC ..................................................... 198/860.3
See application file for complete search history.

(56) References Cited

U.S. PATENT DOCUMENTS

| | | | |
|---|---|---|---|
| 4,726,715 A | 2/1988 | Steen et al. .................. | 406/55 |
| 6,796,107 B2 | 9/2004 | Deegan et al. ................ | 53/432 |
| 7,228,960 B2 | 6/2007 | Müller et al. ................. | 198/860.3 |
| 7,316,728 B2* | 1/2008 | Parekh .................. | B01D 15/00 |
| | | | 210/321.8 |
| 10,036,314 B2* | 7/2018 | Hackett ............... | F02D 41/3082 |
| 2008/0251356 A1 | 10/2008 | Bratusa et al. .............. | 198/495 |
| 2011/0318698 A1 | 12/2011 | Gaur et al. .................. | 432/11 |
| 2014/0113361 A1* | 4/2014 | Berasi .................. | C12M 23/14 |
| | | | 435/289.1 |
| 2019/0291976 A1* | 9/2019 | Gilsing ............... | B65G 53/528 |

FOREIGN PATENT DOCUMENTS

| | | |
|---|---|---|
| DE | 203 02 678 U1 | 5/2003 |
| DE | 20 2006 015 233 U1 | 2/2007 |
| EP | 2 305 372 A2 | 4/2011 |
| KR | 10-2004-0042020 A | 5/2004 |
| WO | WO 01/64521 A1 | 9/2001 |

OTHER PUBLICATIONS

Written Opinion dated Jun. 13, 2018 in corresponding PCT International Application No. PCT/EP2018/061309.

Extended European Search Report dated Nov. 29, 2017 in corresponding European Patent Application No. 17170817.5.

* cited by examiner

CONVEYING A MATERIAL TO BE CONVEYED

CROSS-REFERENCE TO RELATED APPLICATIONS

The present application is a 35 U.S.C. §§ 371 national phase conversion of PCT/EP2018/061309, filed May 3, 2018, the contents of which are incorporated herein by reference, which claims priority of European Patent Application No. 17170817.5 filed May 12, 2017, the contents of which are incorporated by reference herein. The PCT International Application was published in the German language.

TECHNICAL FIELD

The invention relates to a conveyor system and to a method for conveying a reactive and/or hot and/or abrasive material to be conveyed.

TECHNICAL BACKGROUND

A reactive material to be conveyed herein is understood to be a material which can chemically and/or physically react with ambient substances that surround the conveyor system, for example with air, in particular with the oxygen of the air. Reactions of this type are typically undesirable since they can lead, for example, to the oxidation of the material to be conveyed and/or to excessive heating of the material to be conveyed, and/or can release fluid, for example degassing gas, which is hazardous to health and/or the environment, and/or dust. In order for contact between a material to be conveyed and ambient substances to be avoided or reduced, a fluid, for example an inert gas such as nitrogen, or a gas mixture of nitrogen and at most 3% oxygen, or a gas mixture which is composed of the chemical components of a flue gas, is often used in order for ambient substances to be displaced from the environment of the material to be conveyed. A fluid here is understood to be a gas or liquid.

WO 01/64521 A1 discloses a method and a device for packing ultra-fine powder into containers. The powder in a monitored environment in a hermetically sealed device in which the internal environment does not react with the powder is delivered into a powder dispensing chamber. The powder dispensing chamber has a connector for receiving a container, wherein the connector is selectively closable by a first valve, and each container is closable by a second valve.

U.S. Pat. No. 3,036,440 A discloses a method for cooling briquets in which the briquets are sprayed with an evaporation-capable liquid coolant. A majority of the coolant evaporates, is trapped, and is reused for the renewed cooling of briquets.

SUMMARY OF THE INVENTION

The invention is based on the object of specifying a conveyor system and a method for conveying a reactive material to be conveyed, the conveyor system and the method are in particular improved in terms of the consumption of fluid for displacing ambient substances from the environment of the material to be conveyed.

A conveyor system according to the invention for continuously or discontinuously conveying a reactive and/or hot and/or abrasive material to be conveyed along a conveying path comprises a system housing which encases the conveying path and has at least one fluid inlet for directing fluid into the system housing, at least one fluid outlet for dispensing fluid from the system housing, and a charging inlet for introducing material to be conveyed into the system housing. Except for at least one fluid inlet, the at least one fluid outlet, and the charging inlet, the system is embodied so as to be technically fluid-tight. A technical fluid tightness here is understood to be a fluid tightness which meets a technical specification. Fluid tightness hereunder is in each case understood to be a technical fluid tightness.

Arrangement of the conveying path in a system housing enables the conveying path to be largely encapsulated in relation to the environment of the conveying path such that the material to be conveyed is largely shielded in relation to ambient substances. On account of the largely fluid-tight embodiment of the system housing exiting of fluid from the system housing is limited to the fluid outlets such that only a relatively minor quantity of fluid escapes from the system housing. The largely fluid-tight embodiment of the system housing furthermore enables fluid exiting the system housing to be at least partially trapped in a targeted manner at the fluid outlets and be returned to the system housing. The consumption and the costs of the fluid used are thereby advantageously reduced. Degassing gas and dust forming in the system housing can also be discharged in a targeted manner at the fluid outlets. Separate trapping and disposal devices at other locations for dust or degassing gas exiting the system housing may be advantageously dispensed with on account thereof.

The invention furthermore provides that the system housing has a dispensing opening for dispensing material to be conveyed from the system housing, and that the dispensing opening is a fluid outlet or a fluid inlet of the system housing. Therefore, fluid can be introduced or discharged through the dispensing opening of the system housing, which is present in any case. Furthermore, a fluid flow direction in which the fluid flows through the system housing is advantageously adapted to flowing in a conveying direction in which the material to be conveyed is transported to the dispensing opening. Furthermore, turbulence in the fluid flow can advantageously be reduced.

One design embodiment of the invention provides that the dispensing opening is closable by a shut-off element. The shut-off element can have one or a plurality of mutually spaced apart shut-off gates for closing the dispensing opening, for example. Exiting of fluid and degassing gas from the dispensing opening can thereby be prevented, for example in the case of an emergency shutdown of the conveyor system. On account of there being a plurality of mutually spaced apart shut-off gates, the dispensing opening can in particular be closed in a fluid tight and lock-type manner.

One further design embodiment of the invention provides at least one safety element which is disposed on the system housing. It is configured for discharging fluid from the system housing when a fluid pressure in the system housing exceeds a pressure threshold value, or for closed-loop controlling the fluid pressure so as to maintain the fluid pressure in a monitored pressure range. A positive pressure in the system housing can advantageously thereby be prevented.

One further design embodiment of the invention provides a fluid recirculation system which is configured for directing fluid into the system housing through at least one fluid inlet, and for trapping and reusing fluid exiting the system housing through at least one fluid outlet. The consumption of fluid can advantageously be further lowered on account of a fluid recirculation system of this type, since fluid is extracted from the system housing and by way of the fluid recirculation system is returned to the system housing such that the fluid remains in the fluid recirculation system.

The fluid recirculation system can in particular have a turbomachine for directing fluid into the system housing. As a result, the fluid flow direction of the fluid into the system housing and through the system housing can advantageously be influenced.

The fluid recirculation system can furthermore have a heat exchanger for cooling the fluid and/or a fluid purification unit for purifying fluid exiting the system housing. A heat exchanger for cooling the fluid is particularly advantageous in cases in which a hot material to be conveyed is transported in the system housing and components of a conveyor mechanism for conveying the material to be conveyed that require cooling are disposed in said system housing. In these cases, fluid directed into the system housing and cooled by the heat exchanger can advantageously also be used for cooling components of the conveyor mechanism. Fluid that has been extracted from the system housing can be purified by a fluid purification unit, for example be purified of degassing gas and/or of dust which form/forms in the system housing and are/is transported conjointly with the fluid.

One further design embodiment of the invention provides that the charging inlet is closable in a fluid-tight manner by a shut-off element. Exiting of fluid and degassing gas from the charging inlet can thereby be prevented, for example in the case of an emergency shutdown of the conveyor system.

In the method according to the invention for operating a conveyor system according to the invention, a fluid is directed into the system housing through the at least one fluid inlet, and then in a fluid flow direction which is substantially parallel to the conveying direction in which the material to be conveyed is transported through the system housing and is directed to the at least one fluid outlet through the system housing. Therefore, fluid, degassing gas entrained with the fluid, and/or dust entrained with the fluid, can be directed in a defined fluid flow direction through the system housing to the fluid outlets and can be discharged there. Moreover, turbulences of the fluid flow, the degassing flow, and the dust flow in the system housing can advantageously be reduced.

One design embodiment of the method provides that a fluid atmosphere in the system housing is closed-loop controlled in such a manner that the fluid atmosphere counteracts any ingress into the system housing of a disturbance fluid from a neighboring apparatus neighboring the system housing. A fluid atmosphere in the system housing is understood to be the chemical and physical properties, for example the chemical composition, the pressure, or the temperature, of a fluid which is situated in the system housing. A disturbance fluid is understood to be a fluid that is not desired in the system housing. Typical disturbance fluids are oxygen-containing gases or gases which contain at least one undesirable chemical component in an excessive concentration, or fluids which are too hot or too cold. Closed-loop control of the fluid atmosphere in the system housing counteracts any ingress of disturbance fluid into the system housing and particularly prevents a comparatively large quantity of disturbance fluid making its way into the system housing and comprising the quality of the material to be conveyed on account of pressure variations in a neighboring apparatus.

For example, a fluid pressure in the system housing is closed-loop controlled to a nominal value, which is higher than a current disturbance fluid pressure in the neighboring apparatus. For example, if a differential pressure herein between the fluid pressure in the system housing and the disturbance fluid pressure in the neighboring apparatus is detected, a fluid flow directed into the system housing is closed-loop controlled as a function of the differential pressure.

The properties, features, and advantages of this invention described above, and the manner in which said properties, features, and advantages are achieved, will become more evident and readily understandable in the context of the description hereunder of exemplary embodiments which are explained in more detail in conjunction with the drawings in which:

DESCRIPTION OF EMBODIMENTS

Mutually corresponding parts are provided with the same reference signs in the figures.

Figure 1:
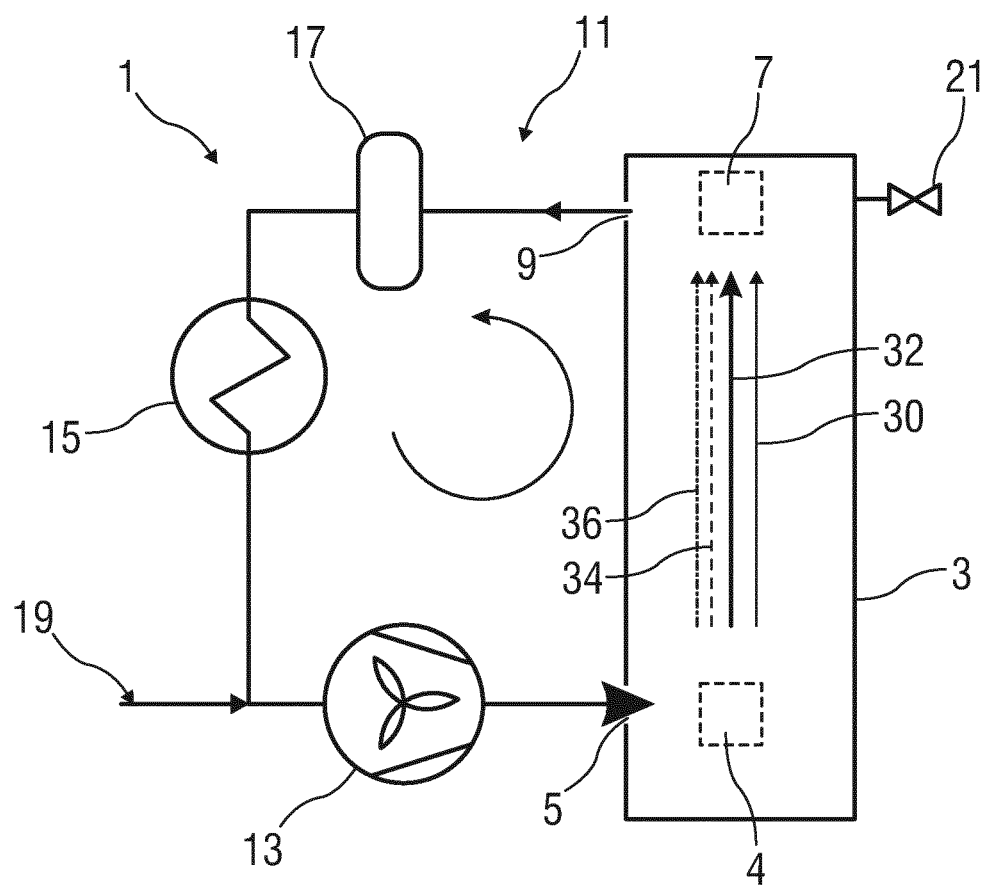
FIG. 1 schematically shows a first exemplary embodiment of a conveyor system according to the invention.

FIG. 1 schematically shows an exemplary embodiment of a conveyor system 1 for conveying a reactive and/or hot and/or abrasive material to be conveyed along a conveying path. The conveyor system 1 has a system housing 3 in which the conveying path is disposed. The system housing 3 has a charging inlet 4 for introducing material to be conveyed into the system housing, a fluid inlet 5 for directing fluid into the system housing 3, and two fluid outlets 7, 9 for dispensing fluid from the system housing 3. A first fluid outlet 7 is a dispensing opening for dispensing material to be conveyed from the system housing 3. Except for the at least one fluid inlet 5, the fluid outlets 7, 9, and the charging inlet 4, the system housing 3 is embodied so as to be fluid-tight.

The conveyor system 1 has a fluid recirculation system 11 which is configured for directing fluid into the system housing and for trapping and reusing fluid extracted from the system housing 3. The fluid directed into the system housing 3 is, for example, an inert gas such as nitrogen, but alternatively can also be a liquid.

The fluid recirculation system 11 directs fluid through the fluid inlet 5 into the system housing 3, through the system housing 3, and through the second fluid outlet 9 out of the system housing 3. Furthermore, the fluid recirculation system 11 directs the fluid exiting the system housing 3 through the second fluid outlet 9 by way of a turbomachine 13 and optionally by way of a heat exchanger 15 and/or a fluid purification unit 17 back into the system housing 3 through the fluid inlet 5. The fluid recirculation system 11 furthermore has a fluid infeed 19 through which fluid is capable of being fed to the fluid recirculation system 11, in particular so as to replace fluid which exits the system housing 3 through the first fluid outlet 7. The turbomachine 13 is, for example, a blower, or a compressor, or another pressure-increasing apparatus, or a pump, depending on whether the fluid is a gas or liquid. On account of the turbomachine 13, the fluid is directed into the system housing 3 at a pressure which is higher than a pressure in the system housing 3 such that the fluid enters into the system housing 3 through the fluid inlet 5 but does not exit the system housing 3. The fluid inlet 5 in the case of this exemplary embodiment is disposed close to the charging inlet 4. The second fluid outlet 9 is disposed close to the first fluid outlet 7. On account thereof, the fluid is directed to the fluid outlets 7, 9 through the system housing 3 in a fluid flow direction 30 which is substantially parallel to a conveying direction 32 in which the material to be conveyed is transported through the system housing 3. Furthermore, degassing gas that is created in the system housing 3 is directed conjointly with the fluid in a degassing flow direction 34 which is substantially parallel to a conveying direction 32, and dust that forms in the system housing 3 is directed conjointly with the fluid in a dust flow direction 36 which is substantially parallel to a conveying direction 32, through the system housing 3 to the fluid outlets 7, 9. In other exemplary embodiments, the fluid inlet 5 and/or the second fluid outlet 9 can also be disposed at other locations than in the locations of the system housing 3 shown in FIG. 1, for example be mutually swapped in relation to FIG. 1. Alternatively, fluid could also be fed to an apparatus, for example a reservoir, that is disposed downstream or upstream of the conveyor system 1, and be fed back from that apparatus to the system housing 3 by way of the fluid recirculation system such that the apparatus becomes part of the fluid recirculation system 11. In this case, dust from the system housing 3 can advantageously also be discharged conjointly with the fluid into the downstream or upstream apparatus, or be disposed of on account thereof, respectively. Furthermore, a dust removal device can optionally be provided on the charging inlet 4, wherein more fluid is fed to the fluid infeed 19 than is discharged from the system housing 3 by the dust removal device.

The optional heat exchanger 15 serves for cooling the fluid. The optional heat exchanger 15 is particularly advantageous when a hot material to be conveyed is transported in the system housing 3 and components of a conveyor mechanism 23, shown in FIG. 2 for conveying the material to be conveyed that are to be cooled are disposed in said system housing 3. In these cases, the fluid directed into the system housing 3 and cooled by the heat exchanger 15 can advantageously also be used for cooling components of the conveyor mechanism 23. Fluid extracted from the system housing 3 can be purified by the optional fluid purification unit 17, for instance of degassing gas and/or of dust which are/is formed in the system housing 3 and transported by the fluid.

Due to the largely fluid-tight embodiment of the system housing 3, exiting of fluid from the system housing 3 is limited to the fluid outlets 7, 9 such that only a relatively minor quantity of fluid escapes from the system housing 3. Furthermore, fluid discharged from the second fluid outlet 9 is returned to the system housing 3 again by the fluid recirculation system 11 by way of the first fluid inlet 5 such that the fluid remains in the fluid recirculation system 11. Overall, the quantity of fluid to be fed to the fluid recirculation system 11 can be kept relatively minor on account thereof. The consumption of fluid and the costs for the fluid are advantageously reduced on account thereof.

The fluid flows through the first fluid inlet 5 and the second fluid outlet 9 are typically significantly larger than the fluid flow flowing through the first fluid outlet 7. For example, the fluid flow flowing through the first fluid inlet 5 can be approximately 1600 m$^3$/h, the fluid flow flowing through the second fluid outlet 9 can be approximately 1500 m$^3$/h, and the fluid flow flowing through the first fluid outlet 7 can be approximately 100 m$^3$/h, wherein the fluid recirculation system 11 is fed approximately 100 m$^3$/h of fluid by the fluid infeed 19 so as to replace the fluid flowing out through the first fluid outlet 7.

A further advantage of the largely fluid-tight embodiment of the system housing 3 and the fluid flow direction 30 is that degassing gas and dust can likewise be directed to the fluid outlets 7, 9 and be disposed of there.

A safety element 21 configured as a safety valve which is configured for letting out fluid from the system housing 3 when a fluid pressure in the system housing 3 exceeds a pressure threshold value is disposed on the system housing 3.

Figure 2:
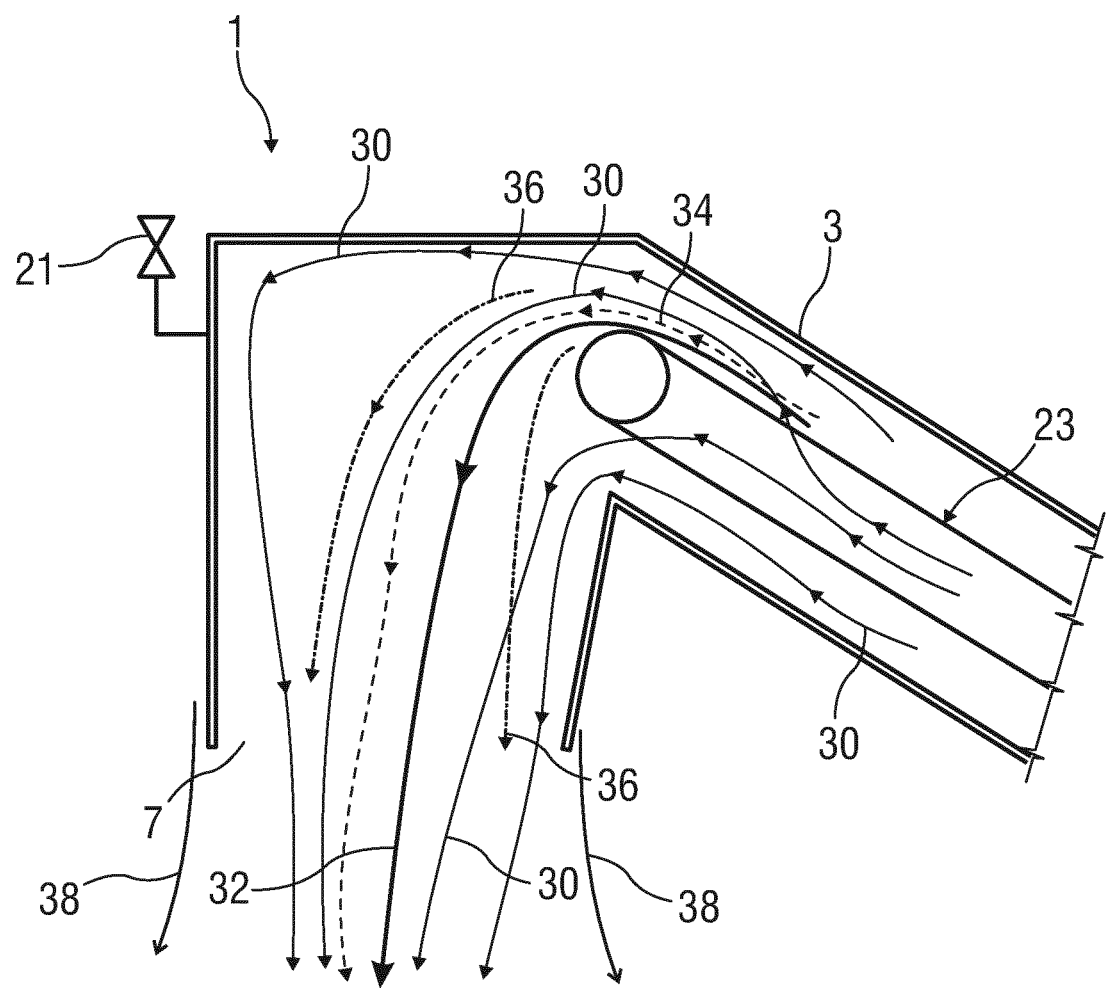
FIG. 2 schematically shows a sectional illustration of the conveyor system illustrated in FIG. 1, in a region of a dispensing opening for dispensing material to be conveyed from the system housing having an opened dispensing opening.

FIG. 2 schematically shows a sectional illustration of the conveyor system 1 in the region of the first fluid outlet 7, the latter simultaneously being the dispensing opening of the system housing 3. The material to be conveyed is transported by the conveyor mechanism 23 to the first fluid outlet 7 and there is dispensed downward through the fluid outlet 7. Fluid, degassing gas and dust are also dispensed conjointly with the material to be conveyed from the fluid outlet 7. Since degassing gas and dust are dispensed conjointly with the material to be conveyed from the fluid outlet 7, said degassing gas and dust can be discharged and disposed of conjointly with the material to be conveyed. Separate trapping and disposal devices at other locations for dust or degassing gas exiting the system housing 3 are advantageously dispensed with on account thereof.

It can optionally be provided for the fluid outlet 7 to be surrounded by a flow of a gas curtain 38 which shrouds the matter (material to be conveyed, fluid, degassing gas, dust) exiting the fluid outlet 7.

The first fluid outlet 7 can furthermore be closable by a shut-off element 40.

Figure 3:
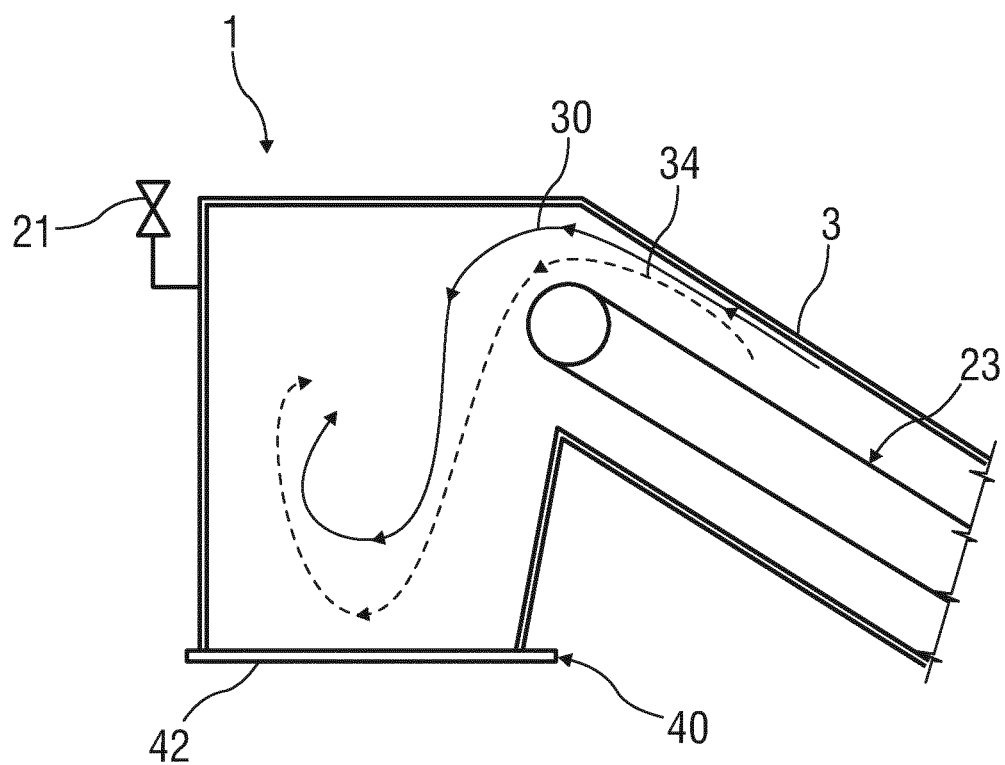
FIG. 3 schematically shows a sectional illustration of the conveyor system shown in FIG. 2, having a closed dispensing opening.

FIG. 3 shows a sectional illustration of the conveyor system 1 in the region of the first fluid outlet 7 which is closed by a shut-off element 40. The shut-off element 40 has, for example, a shut-off gate 42 for closing the first fluid outlet 7. Exiting of fluid and degassing gas from the first fluid outlet 7 can be prevented on account thereof, for example in the case of an emergency shutdown of the conveyor system 1. Accordingly, the charging inlet 4 can also be closable in a fluid-tight manner by a shut-off element 40.

Figure 4:
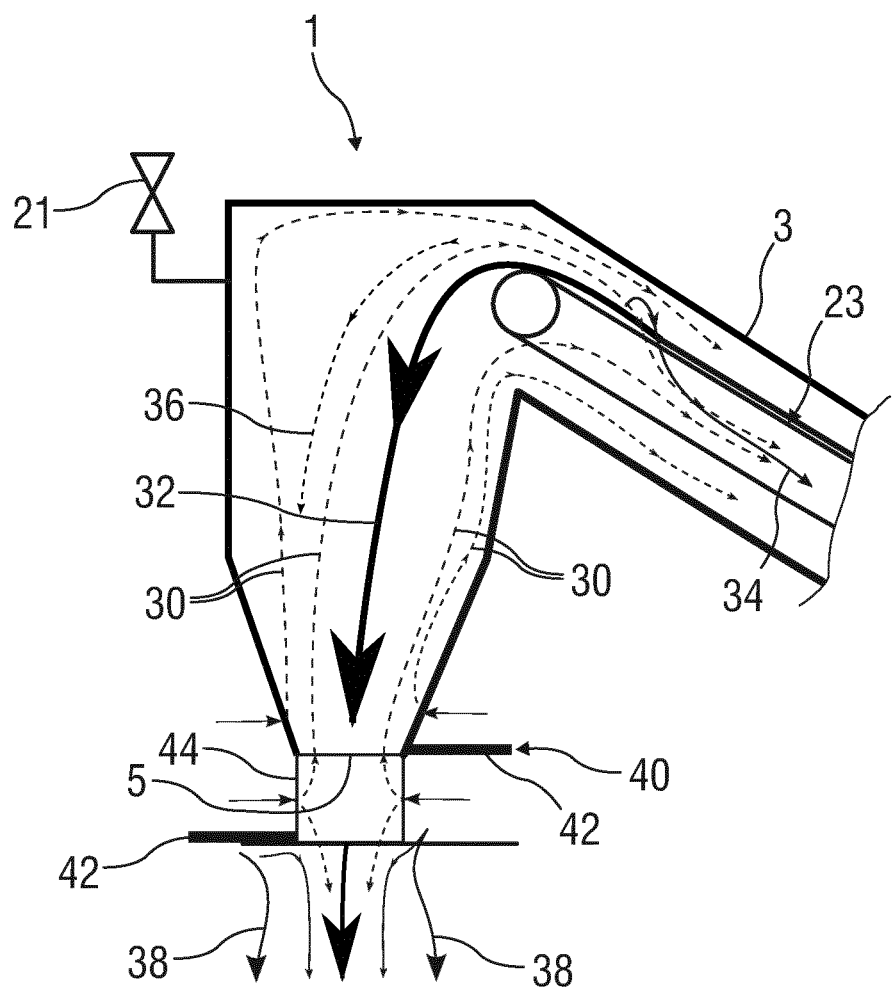
FIG. 4 schematically shows a sectional illustration of a second exemplary embodiment of a conveyor system in the region of a dispensing opening for dispensing material to be conveyed.

FIG. 4 schematically shows a sectional illustration of a second exemplary embodiment of a conveyor system 1 in the region of a dispensing opening for dispensing material to be conveyed. This exemplary embodiment differs from the exemplary embodiment illustrated in FIGS. 1-5 in that the dispensing opening is a fluid inlet 5 for directing fluid into the system housing 3. The fluid and the degassing gas flow in a substantially parallel manner, but by contrast to FIG. 2, at least along a sub-portion of the conveying path, counter to a conveying direction 32 of the material to be conveyed and a dust flow direction 36 of dust within the system housing 3. A further difference in comparison to the conveyor system 1 illustrated in FIGS. 1-3 is that the shut-off element 40 has two mutually spaced apart shut-off gates 42, and an auxiliary apparatus 44 is disposed between the shut-off gates 42. The auxiliary apparatus 44 is, for example, a cellular wheel sluice for channeling material to be conveyed out of the system housing 3.

Figure 5:
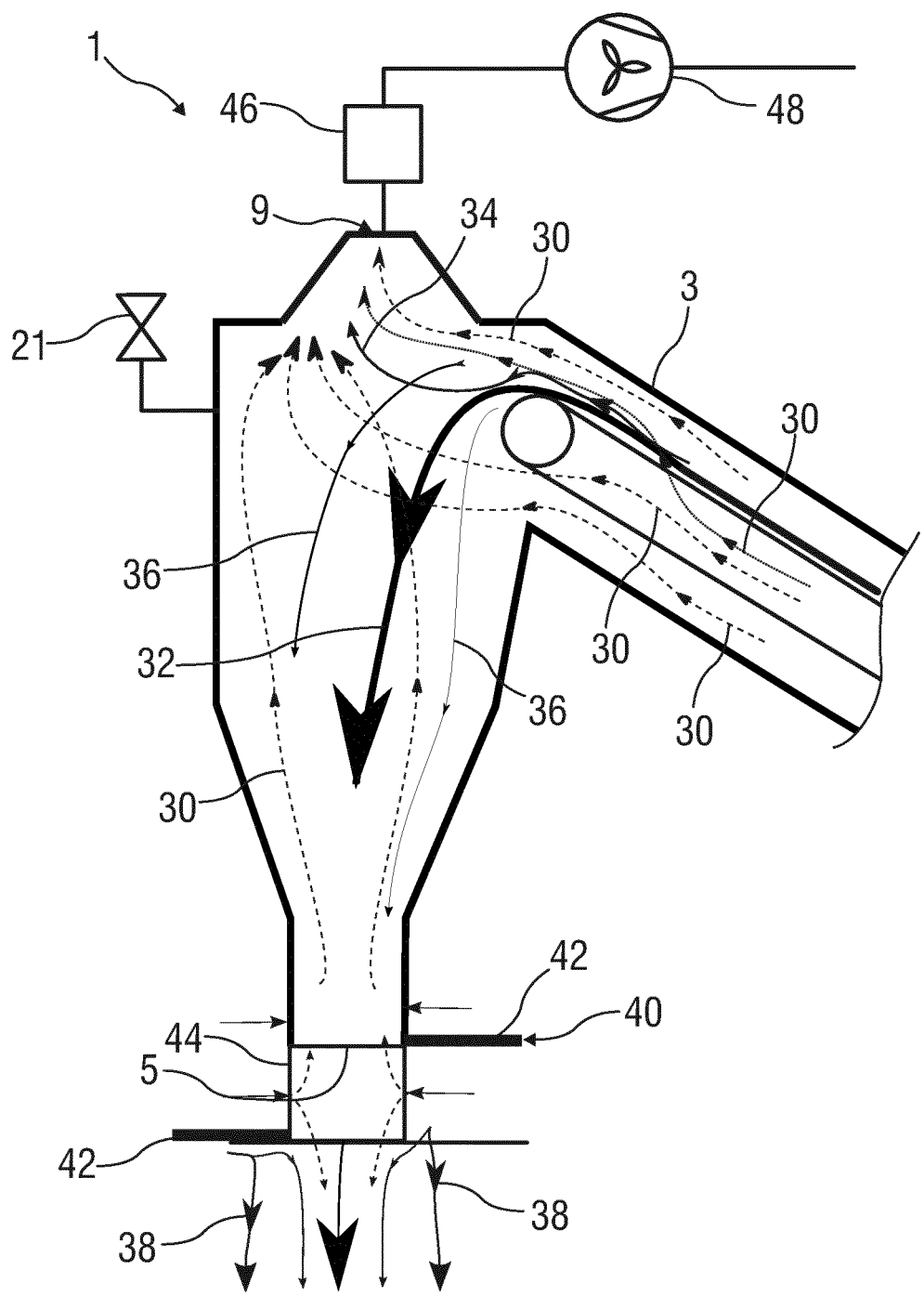
FIG. 5 schematically shows a sectional illustration of a third exemplary embodiment of a conveyor system in the region of a dispensing opening for dispensing material to be conveyed.

FIG. 5 schematically shows a sectional illustration of a third exemplary embodiment of a conveyor system 1 in the region of a dispensing opening for dispensing material to be conveyed. This exemplary embodiment differs from the exemplary embodiment illustrated in FIG. 4 in that fluid is directed into the system housing 3 both through the dispensing opening as well as through a further fluid inlet 5 wherein the fluid flow direction 30 of the fluid directed into the system housing 3 through the dispensing opening, at least along a sub-portion of the conveying path, is substantially counter to a conveying direction 32 of the material to be conveyed, and the fluid flow direction 30 of the fluid directed into the system housing 3 through the further fluid inlet 5 is substantially identical to the conveying direction 32.

Moreover, the system housing 3 has a fluid outlet 9 through which fluid is discharged from the system housing 3, a filter system 46 for filtering fine dust and a vacuum generator 48 for suctioning fluid from the system housing 3 being disposed downstream of the fluid outlet 9. Fluid which is discharged from the system housing 3 through the fluid outlet 9 is, for example, either disposed of or at least in part reused because that fluid is returned to the system housing 3 by way of a fluid recirculation system 11, in a manner analogous to FIG. 1.

While the invention has been illustrated and described in detail by preferred exemplary embodiments, the invention is not limited by the disclosed examples, and other variations can be derived therefrom by the person skilled in the art without departing from the scope of protection of the invention.

LIST OF REFERENCE SIGNS

1 Conveyor system
3 System housing
4 Charging inlet
5 Fluid inlet
7, 9 Fluid outlet
11 Fluid recirculation system
13 Turbomachine
15 Heat exchanger
17 Fluid purification unit
19 Fluid infeed
21 Safety element
23 Conveyor mechanism
30 Fluid flow direction
32 Conveying direction
34 Degassing flow direction
36 Dust flow direction
38 Gas curtain
40 Shut-off element
42 Shut-off gate
44 Auxiliary apparatus
46 Filter system
48 Vacuum generator

The invention claimed is:

1. A conveyor system for continuously or discontinuously conveying a reactive and/or hot and/or abrasive material to be conveyed along a conveying path, the conveyor system comprising:
a system housing which encases the conveying path, the system housing having at least one fluid inlet for directing fluid into the system housing, at least one fluid outlet for dispensing fluid from the system housing and at least another fluid outlet for dispensing fluid and the material to be conveyed, a charging inlet for introducing material to be conveyed into the system housing;
a fluid recirculation system connected to the at least one fluid inlet to direct fluid into the system housing through the at least one fluid inlet, and connected to the at least one fluid outlet to trap and reuse fluid exiting the system housing through the at least one fluid outlet;
the system housing being embodied to be technically fluid-tight except for the at least one fluid inlet, the at least one fluid outlet, the at least another fluid outlet, and the charging inlet.

2. The conveyor system as claimed in claim 1, further comprising a shut-off element configured for closing the dispensing opening.

3. The conveyor system as claimed in claim 2, further comprising the shut-off element comprising at least one shut-off gate configured for closing the dispensing opening.

4. The conveyor system as claimed in claim 3, the shut-off element comprising two mutually spaced apart shut-off gates configured for closing the dispensing opening.

5. The conveyor system as claimed in claim 1, further comprising at least one safety element is disposed on the system housing and configured for discharging fluid from the system housing responsive to a fluid pressure in the system housing that exceeds a pressure threshold value, or configured for closed-loop controlling the fluid pressure so as to maintain the fluid pressure in a monitored pressure range.

6. The conveyor system as claimed in claim 1, further comprising the fluid recirculation system comprising a turbomachine for directing fluid into the system housing.

7. The conveyor system as claimed in claim 1, further comprising the fluid recirculation system has at least one heat exchanger for cooling the fluid.

8. The conveyor system as claimed in claim 1, further comprising the fluid recirculation system comprising a fluid purification unit configured for purifying the fluid exiting the system housing.

9. The conveyor system as claimed in claim 1, further comprising a shut-off element configured for closing the charging inlet in a fluid-tight manner.

10. A method for operating a conveyor system for continuously or discontinuously conveying a reactive and/or hot and/or abrasive material to be conveyed along a conveying path, the conveyor system including,
a system housing which encases the conveying path, the system housing having at least one fluid inlet for directing fluid into the system housing, at least one fluid outlet for dispensing fluid from the system housing, a charging inlet for introducing material to be conveyed into the system housing, and a dispensing opening for dispensing material to be conveyed from the system housing;
the system housing being embodied to be technically fluid-tight except for the at least one fluid inlet, the at least one fluid outlet, and the charging inlet; and
the dispensing opening is the at least one fluid outlet or the at least one fluid inlet of the system housing, the method comprising:
directing a fluid into the system housing through the at least one fluid inlet and in a fluid flow direction and transporting the material to be conveyed through the system housing in a conveying direction, wherein the fluid flow direction is substantially parallel to the conveying direction in which the material to be conveyed is transported through the system housing, 1 and directing the fluid to the at least one fluid outlet through the system housing.

11. The method as claimed in claim 10, further comprising:
controlling a fluid atmosphere in the system housing in a closed-loop control such that the fluid atmosphere counteracts ingress into the system housing of a disturbance fluid from a neighboring apparatus which neighbors the system housing.

12. The method as claimed in claim 11, further comprising closed-loop controlling a fluid pressure in the system housing to a nominal value which is higher than a current disturbance fluid pressure in the neighboring apparatus.

13. The method as claimed in claim 12, further comprising detecting a differential pressure between the fluid pressure in the system housing and the disturbance fluid pressure in the neighboring apparatus, and closed-loop controlling a fluid flow directed into the system housing as a function of the differential pressure.

14. A method for operating a conveyor system for continuously or discontinuously conveying a reactive and/or hot and/or abrasive material which is to be conveyed along a conveying path, the conveyor system comprising:
a system housing which encases the conveying path and which comprises at least one fluid inlet for directing fluid into the system housing, at least one fluid outlet for dispensing fluid from the system housing, a charging inlet for introducing material to be conveyed into the system housing, and a dispensing opening for dispensing material to be conveyed from the system housing;
with the exception of the at least one fluid inlet and of the at least one fluid outlet, and of the charging inlet, embodying the housing so as to be technically fluid-tight, wherein the dispensing opening is a fluid outlet or is a fluid inlet of the system housing;
directing a fluid into the system housing through the at least one fluid inlet, and in a fluid flow direction which is substantially parallel to a conveying direction; and
transporting the material to be conveyed through the system housing directing the material to the at least one fluid outlet through the system housing; and
forming a fluid atmosphere in the system housing which is closed-loop controlled in such a manner that the fluid atmosphere counteracts ingress into the system housing of a disturbance fluid from a neighboring apparatus which neighbors the system housing;
closed-loop controlling of fluid pressure in the system housing to a nominal value which is higher than a current disturbance fluid pressure in the neighboring apparatus and recirculating fluid into a fluid recirculation system of the conveyor system housing and through the at least one fluid inlet; and
trapping and reusing fluid exiting the system housing through at least one of the fluid outlets.

15. The method as claimed in claim 14, further comprising discharging fluid from the conveyor system housing via at least one safety element when a fluid pressure in the system housing exceeds a pressure threshold value, or for closed-loop controlling the fluid pressure so as to maintain the fluid pressure in a monitored pressure range; and
disposing the at least one safety element on the system housing.

16. The method as claimed in claim 14, further comprising directing fluid into the system housing via a fluid recirculating system having a turbomachine into the system housing from the flush recirculation system having a turbomachine for directing fluid into the system housing.

17. The method as claimed in one of claim 14, further comprising cooling the fluid in at least one heat exchanger of the fluid recirculation system.

18. The method as claimed in claim 14, further comprising purifying the fluid exiting the system housing by a fluid purification unit of the fluid recirculation system.

19. The method as claimed in claim 14, further comprising detecting a differential pressure between the fluid pressure in the system housing and the disturbance fluid pressure in the neighboring apparatus, and a closed-loop controlling fluid flow directed into the system housing as a function of the differential pressure.

* * * * *